(12) United States Patent
Graf

(10) Patent No.: US 6,863,133 B2
(45) Date of Patent: Mar. 8, 2005

(54) LAWN AERATING DEVICE

(75) Inventor: Eberhard Graf, Kirchen (DE)

(73) Assignee: Wolf-Garten GmbH & Co. KG (DE)

( * ) Notice: Subject to any disclaimer, the term of this patent is extended or adjusted under 35 U.S.C. 154(b) by 0 days.

(21) Appl. No.: 10/472,698

(22) PCT Filed: Aug. 22, 2002

(86) PCT No.: PCT/EP02/09410
§ 371 (c)(1),
(2), (4) Date: Sep. 23, 2003

(87) PCT Pub. No.: WO03/017746
PCT Pub. Date: Mar. 6, 2003

(65) Prior Publication Data
US 2004/0149455 A1 Aug. 5, 2004

(30) Foreign Application Priority Data
Aug. 24, 2001 (DE) .......................... 101 41 537

(51) Int. Cl.$^7$ ............................................. A01D 77/00
(52) U.S. Cl. ........................................................ 172/79
(58) Field of Search ............................ 111/14; 172/21, 172/22, 77–79, 620–622, 540–556; 56/400–400.2, 16.7, 16.9

(56) References Cited

U.S. PATENT DOCUMENTS

| 3,460,629 A | | 8/1969 | Shapland, Jr. et al. | |
| 3,512,345 A | * | 5/1970 | Smith | 56/16.9 |
| 4,446,681 A | | 5/1984 | Dynie et al. | 56/16.7 |
| 5,014,504 A | * | 5/1991 | Oechsle | 56/372 |
| 5,611,291 A | * | 3/1997 | Pogue | 111/14 |
| 6,196,329 B1 | * | 3/2001 | Pierce | 172/543 |
| 6,237,695 B1 | * | 5/2001 | Pierce et al. | 172/79 |

FOREIGN PATENT DOCUMENTS

| DE | 196 44 061 | 6/1998 |
| EP | 0 024 696 | 3/1981 |
| GB | 1 221 765 | 2/1971 |
| GB | 2 116 412 | 9/1983 |

* cited by examiner

Primary Examiner—Robert E Pezzuto
(74) Attorney, Agent, or Firm—Ostrolenk, Faber, Gerb & Soffen, LLP

(57) ABSTRACT

A lawn aerator with a roller mounted in a rotatable manner in a chassis. The roller is formed by disks that are joined together and have radial recesses in which aerator elements are anchored. The aerator elements have radially projecting, elastic wire spring arms. In an interanchorage region the wire spring arms have a coil made up of a plurality of turns and an extension. The recesses further contain carrier stubs that run in an axis-parallel manner and on which the coils of the spring arms are positioned. The extensions of the spring arms are supported in a form-fitting manner in the stressing direction within the recesses. The extensions of two of the spring arms are combined to give an elastic connecting clip and form a pair of spring arms in each case. In the recesses, in each two carrier stubs are arranged axially opposite one another with a spacing between them such that the coils of the pair of springs can be inserted therebetween and spread apart onto the opposite carrier stubs.

9 Claims, 2 Drawing Sheets

LAWN AERATING DEVICE

Figure 1:
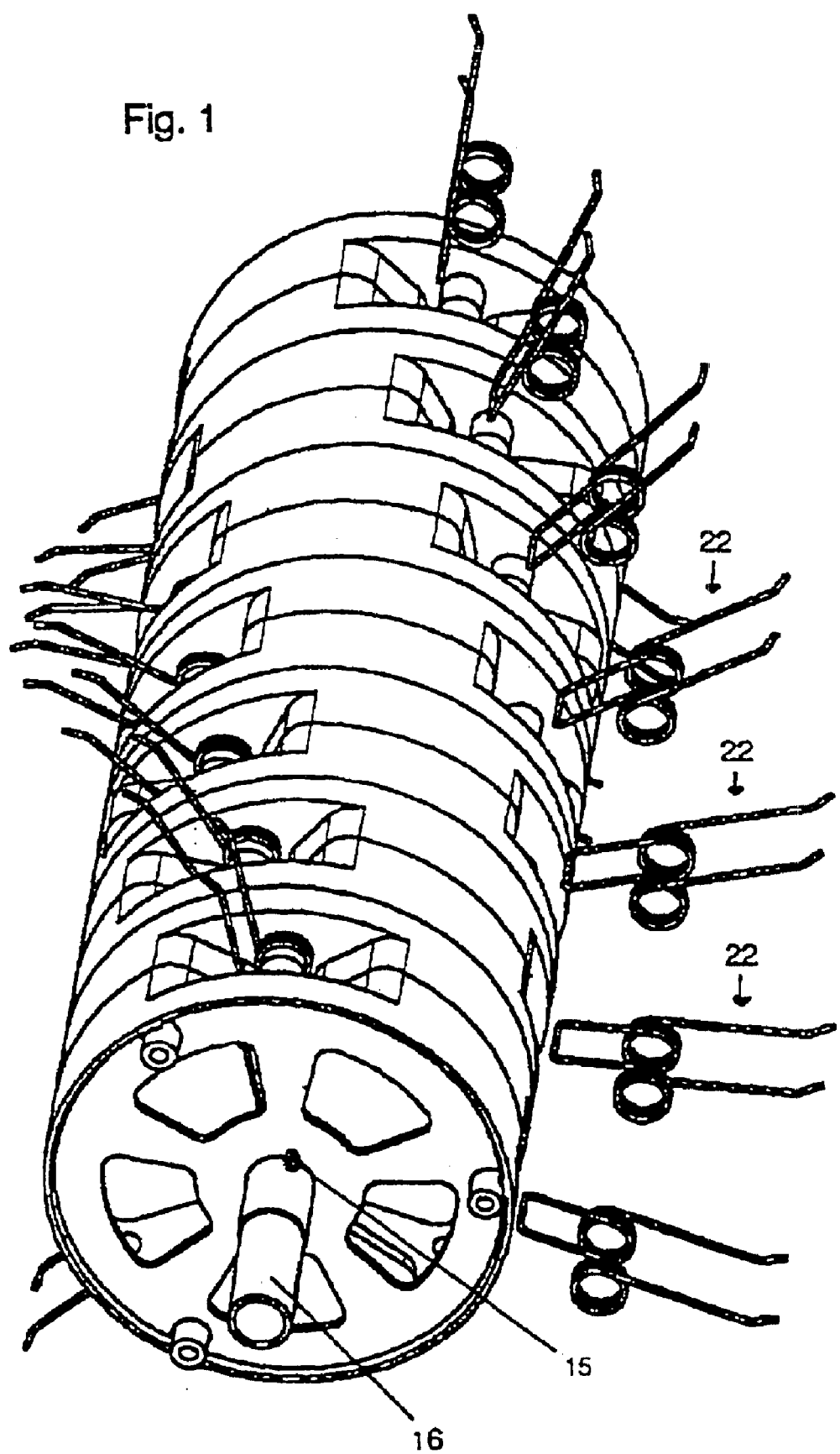

The invention relates to a lawn aerator with a roller which is mounted in a rotatable manner in a chassis and is joined together from disks which bear elastic radially projecting aerator elements in the form of wire spring arms. Such machines assist the necessary exchange of air in the ground surface, it being possible for this exchange of air to be impaired by plant parts which have died off. By virtue of the rotating springs of such a lawn aerator, the interspace between the lawn plants is loosened and more air is introduced into the topsoil, and it is thus possible for nutrients and water to reach the lawn roots to better effect again. The aerator roller is motor-driven in such machines, and the wire springs act on the topsoil with a variable operating depth.

If these wire spring arms are subjected to excessive stressing during operation, for example if they strike against stones or other hard objects such that they cannot cushion the forces which occur, then these springs usually break in the vicinity of the circumference of the roller.

In the case of known machines (e.g. EP-A-0 024 696), it has been necessary, for the purpose of replacing a broken wire spring, for the carrier roller to be dismantled to the extent where the spring clamped therein can be removed and replaced by a new wire spring. Thereafter, bracing had to be provided again in order to clamp the wire spring firmly. The preamble of patent claim 1 takes this known prior art as its departure point.

U.S. Pat. No. 3,460,629 discloses a lawn aerator in the case of which, according to FIGS. 4 and 5, spring arms are combined in pairs, the turns of the spring arms being positioned from the outside on stubs which project laterally on carriers which are screwed, by means of screw bolts, on a hexagonal hollow shaft. These carrier elements, at the same time, secure the connecting clip between the two spring arms on the hollow shaft, with the result that a pair of springs can only be exchanged once the screw connection has been released. It is also the case with the other exemplary embodiments in this document that the springs can only be exchanged once a screw connection has been released.

GB-A-2 116 412 presents a lawn aerator in the case of which spring arms are combined into pairs [lacuna] a wound coil, the coil resting in each case in a cylindrical mount into which the springs can be inserted via a slot. The shaped bodies which bear the spring arms can be clamped on the horizontal blade shaft of a lawnmower in order for it to be possible for the latter to act as a rake. It is obviously only possible here, however, for the springs to be fitted when the shaped body has been removed from the lawnmower, i.e. they cannot be fitted when the lawnmower is in the operating state.

The object of the invention is to provide a lawn aerator of the generic type in the case of which an aerator spring which has become unusable can easily be exchanged without the carrier roller or its disks being dismantled, and the aerator springs are reliably secured during operation.

The set object is achieved by the features specified in the defining part of patent claim 1.

In the case of the lawn aerator according to the invention, in contrast, the pairs of springs can easily be inserted and/or exchanged by the user, to be precise even without the aid of tools. Exchange is particularly straightforward if cut-pliers are utilized.

This makes it possible for broken aerator springs to be removed, and replaced by new ones, without the roller being dismantled, simply by the two spring arms being pressed toward one another and plugged into the corresponding recesses of a pair of disks, whereupon anchoring takes place by the spring arms spreading apart.

Accordingly, the invention consists in combining the spring arms in pairs in each case, the connecting leg of two spring arms ensuring the spreading action, with the result that the two spring arms can be secured in the radial recesses by anchorings. The spring arms are preferably spread apart in the axial direction, anchoring elements being inserted in axially opposite surfaces of radial recesses of the disks. These anchoring elements are preferably designed as stubs, on which the two wound coils of the spring arms may be positioned once the two spring arms have been bent toward one another and the coils have been introduced into the interspace between the anchoring stubs, this allowing the coils to spread apart onto the anchoring stubs. Instead of the coils or stubs, it is also possible to use other kinds of anchoring elements, for example laterally bent projections of the spring arms, which can be spread apart into corresponding holes.

Configurations of the invention can be gathered from the subclaims.

Figure 2:
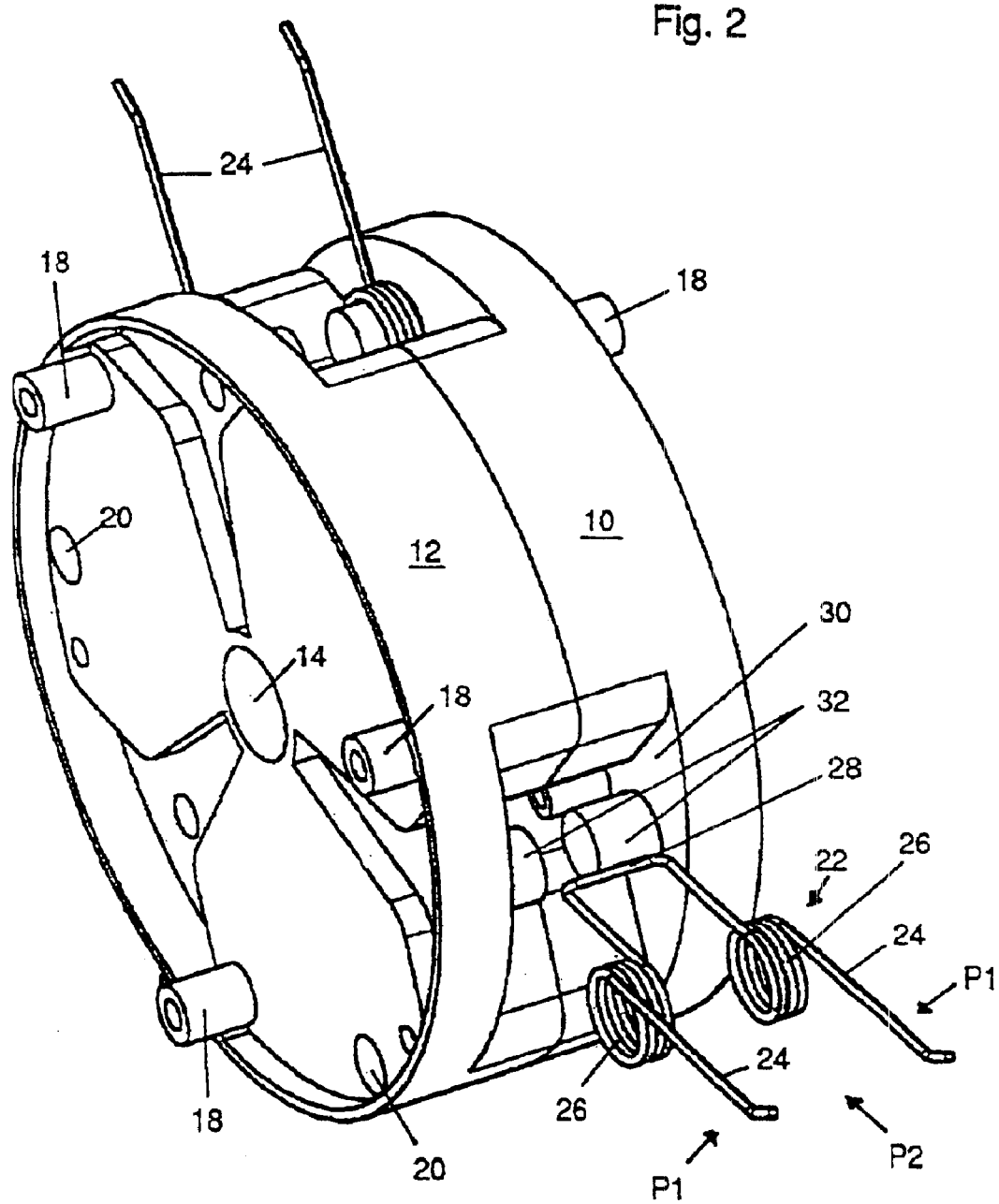

An exemplary embodiment of the invention is described hereinbelow with reference to the drawing, in which:

FIG. 1 shows a perspective illustration of a roller of a lawn aerator, the roller bearing the aerator springs; and FIG. 2 shows a perspective illustration of a pair of carrier disks of the roller according to FIG. 1, it being possible to see how the aerator spring is fitted and removed.

The carrier roller according to FIG. 1 comprises pairs of disks 10, 12 which are pushed onto a shaft 16 by way of their central hole 14 and braced axially in relation to one another. The shaft 16 is mounted in a rotatable manner in a chassis (not illustrated) of the lawn aerator and is made to rotate, via either the wheels of the chassis or a motor, when the machine is moved over the lawn.

The carrier disks 10, 12 which make up a pair are connected to one another in a rotationally fixed manner by form fitting. The rotationally fixed connection to the shaft 16 may be produced by metal carry-along elements 15 which are welded to the shaft 16. The end sides of each pair are provided with in each case three axially projecting fitting pins 18, which engage in a form-fitting manner in fitting holes 20 of the adjacent pair. This makes it possible for the pairs of disks to be offset at an angle in relation to one another such that the aerator springs 22 which they bear are staggered over the roller circumference, as can be seen from FIG. 1. Each aerator spring 22 comprises a specifically bent spring wire. Each aerator spring has two spring arms 24, the ends of which are angled forward in the direction of rotation. These spring arms 24 project from the two outer ends of coils 26 which are wound from the spring wire. The inner ends of the coils 26 are extended into a U-shaped connecting clip 28. The entire aerator spring 22 formed in this way comprises a single piece of spring wire.

The pairs of disks have radial recesses at an angular spacing of 120° in relation to one another, it being possible for the connecting clips 28 of the aerator springs to be plugged into said recesses. The aerator springs are secured by carrier stubs 32 which are spaced apart axially opposite one another within the recess 30. The diameter of the carrier stubs 32 is adapted to the diameter of the coils 26 such that the coils can be plugged onto the carrier stubs.

These aerator springs may be fitted while the pairs of disks of the roller remain braced in relation to one another, i.e. are located in their operating position. The fitting operation may take place by the spring arms 24, according to FIG.

2, being pushed toward one another in the direction of the arrow P1 and the aerator spring being plugged in the direction of the arrow P2. The axial spacing between the carrier stubs 32 is such that the coils 26 can be plugged onto the stubs in the laterally pushed-together state. Once the coils have been plugged on, the connecting clip 28 spreads and the aerator springs 22 are reliably supported by the stubs 32. In the event of spring breakage, the aerator springs may be removed again, and replaced by new ones, in the same way without there being any need to release the mutual axial bracing of the carrier disks and of the pairs of disks.

LIST OF DESIGNATIONS 10 carrier disk
12 carrier disk
14 central hole
15 carry-along element
16 shaft
18 fitting pin
20 fitting hole
22 aerator spring
24 spring arm
26 coil
28 connecting clip
30 radial recesses
32 carrier stub
P1 arrow
P2 arrow

What is claimed is:

1. A lawn aerator with a roller mounted in a rotatable manner in a chassis, wherein
    the roller is formed by a plurality of disks (10, 12) that are joined together;
    the disks (10, 12) have radial recesses (30) in which aerator elements (22) are anchored;
    the aerator elements (22) comprise radially projecting, elastic wire spring arms (24);
    the wire spring arms (24) have an inner anchorage region with a coil (26), comprising a plurality of turns, and an extension;
    the recesses (30) contain carrier stubs (32) which run in an axis-parallel manner and on which the coils (26) of the spring arms are positioned;
    the extensions (28) are supported in a form-fitting manner in the stressing direction within the recesses (30); the lawn aerator comprising the following features:
    the extensions of two spring arms (24) are combined to give an elastic connecting clip and form a pair of spring arms in each case;
    in the recesses (30), in each case two carrier stubs (32) are arranged axially opposite one another and spaced apart so that the coils (26) of a pair of springs can be inserted therebetween and spread apart onto the opposite carrier stubs (32).

2. The lawn aerator as claimed in claim 1, wherein the recesses (30) are arranged in each case in adjacent end sides of a pair of the carrier disks (10, 12).

3. The lawn aerator as claimed in claim 1, wherein the carrier disks each have three recesses (30) which are offset at an angular spacing of 120° in relation to one another.

4. The lawn aerator as claimed in claim 1, wherein adjacent pairs of the carrier disks (10, 12) can be secured in a form-fitting manner in the circumferential direction via fitting elements (18, 20).

5. The lawn aerator as claimed in claim 4, wherein the spring arms (24) of adjacent pairs of the carrier disks are offset at a predetermined angle in the circumferential direction.

6. The lawn aerator as claimed in claim 2, wherein adjacent pairs of carrier disks (10, 12) can be secured in a form-fitting manner in the circumferential direction via fitting elements (18, 20).

7. The lawn aerator as claimed in claim 3, wherein adjacent pairs of carrier disks (10, 12) can be secured in a form-fitting manner in the circumferential direction via fitting elements (18, 20).

8. The lawn aerator as claimed in claim 6, wherein the spring arms (24) of adjacent pairs of the carrier disks are offset at a predetermined angle in the circumferential direction.

9. The lawn aerator as claimed in claim 7, wherein the spring arms (24) of adjacent pairs of the carrier disks are offset at a predetermined angle in the circumferential direction.

* * * * *